(12) United States Patent
Dreibholz et al.

(10) Patent No.: US 9,032,823 B2
(45) Date of Patent: May 19, 2015

(54) DUAL CLUTCH TRANSMISSION DESIGNED AS REDUCTION GEARING

(75) Inventors: Ralf Dreibholz, Meckenbeuren (DE); Juergen Wafzig, Eriskirch (DE); Michael Wechs, Lindau (DE); Markus Renninger, Oerlenbach (DE); Thomas Rosemeier, Meckenbeuren (DE); Johannes Kaltenbach, Friedrichshafen (DE); Rudolf Kauffeldt, Bodolz (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 161 days.

(21) Appl. No.: 13/822,004

(22) PCT Filed: Aug. 3, 2011

(86) PCT No.: PCT/EP2011/063332
§ 371 (c)(1),
(2), (4) Date: Mar. 11, 2013

(87) PCT Pub. No.: WO2012/034777
PCT Pub. Date: Mar. 22, 2012

(65) Prior Publication Data
US 2013/0167676 A1   Jul. 4, 2013

(30) Foreign Application Priority Data
Sep. 13, 2010   (DE) .......................... 10 2010 040 659

(51) Int. Cl.
*F16H 3/08* (2006.01)
*B60K 6/36* (2007.10)
(Continued)

(52) U.S. Cl.
CPC ............. *F16H 3/08* (2013.01); *Y10T 74/19228* (2015.01); *B60K 6/36* (2013.01); *B60K 6/48* (2013.01);
(Continued)

(58) Field of Classification Search
USPC .................................................. 74/330, 331
See application file for complete search history.

(56) References Cited

U.S. PATENT DOCUMENTS 4,658,663 A * 4/1987 Hiraiwa .......................... 74/359
6,209,406 B1 * 4/2001 Sperber et al. .................. 74/330
(Continued)

FOREIGN PATENT DOCUMENTS

DE   10 2005 005 163 A1   9/2006
DE   10 2006 007 010 A1   8/2007
(Continued)

OTHER PUBLICATIONS

European Office Action issued in corresponding European Application No. 11 738 734.0 mailed Feb. 25, 2014.
(Continued)

*Primary Examiner* — Ha D Ho
(74) *Attorney, Agent, or Firm* — Davis & Bujold, P.L.L.C.; Michael J. Bujold

(57) ABSTRACT

A dual clutch transmission designed as a reduction gearing which has concentric central and hollow transmission shafts, exactly one layshaft, and two power shift elements. A hollow shaft is provided coaxially on the layshaft, which can be rotatably fixed to the layshaft, via one shift device, and to which at least two gears of the gear stages are rotatably fixed. A further hollow shaft is provided coaxially on either the central or the hollow transmission shaft, which can be connected, via one of the shift devices, with the central or the hollow transmission shaft and to which at least two further gears of the gear stages are rotatably fixed. At least three transmission ratios are obtainable as a result of engaging the shift element into the power flow in three of the gear stages, by which one transmission ratio results from engaging only one shift element into the power flow.

31 Claims, 5 Drawing Sheets

(51) Int. Cl.
*B60K 6/48* (2007.10)
*B60K 6/547* (2007.10)
*F16H 3/00* (2006.01)

(52) U.S. Cl.
CPC ......... *B60K 6/547* (2013.01); *B60K 2006/4825* (2013.01); *F16H 3/006* (2013.01); *F16H 2003/0803* (2013.01); *F16H 2200/0065* (2013.01); *F16H 2200/0086* (2013.01); *Y02T 10/6221* (2013.01); *Y02T 10/6252* (2013.01)

(56) References Cited

U.S. PATENT DOCUMENTS

| | | | |
|---|---|---|---|
| 7,040,186 B2 * | 5/2006 | Pollak | 74/330 |
| 7,231,843 B2 * | 6/2007 | Gumpoltsberger et al. | 74/329 |
| 7,421,919 B2 * | 9/2008 | Gumpoltsberger et al. | 74/330 |
| 7,472,617 B2 * | 1/2009 | Nicklass | 74/340 |
| 7,500,411 B2 * | 3/2009 | Gumpoltsberger | 74/329 |
| 8,117,932 B2 * | 2/2012 | Bjorck et al. | 74/329 |
| 8,485,055 B2 | 7/2013 | Gumpoltsbeger et al. | |
| 2004/0093972 A1 * | 5/2004 | Gumpoltsberger et al. | 74/325 |
| 2006/0048594 A1 | 3/2006 | Gumpoltsberger et al. | |
| 2007/0214904 A1 | 9/2007 | Ohnemus | |
| 2010/0192717 A1 | 8/2010 | Gitt | |
| 2010/0206107 A1 | 8/2010 | Gumpoltsberger et al. | |
| 2011/0030488 A1 | 2/2011 | Gumpoltsberger et al. | |

FOREIGN PATENT DOCUMENTS

| | | |
|---|---|---|
| DE | 102006054281 A1 | 6/2008 |
| DE | 10 2007 040 449 A1 | 3/2009 |
| DE | 10 2007 049 271 A1 | 4/2009 |
| FR | 2 934 659 A1 | 2/2010 |
| WO | 2006/084555 A1 | 8/2006 |
| WO | 2008/058858 A1 | 5/2008 |
| WO | 2010/015748 A1 | 2/2010 |

OTHER PUBLICATIONS

German Search Report issued in corresponding German Application No. 10 2010 040 659.7 mailed Oct. 30, 2013.

* cited by examiner

| | K1 | K2 | SE1 | | SE2 | | SE3 | | SE4 | | SE5 | |
|---|---|---|---|---|---|---|---|---|---|---|---|---|
| | | | S1 | S2 | S3 | S4 | S5 | S6 | S7 | S8 | S9 | S10 |
| "1" | x | | | x | x | | | | | | | |
| "2" | x | x | | | x | | | | | | | |
| "3" | x | | | x | x | | | | | | | |
| "4" | x | x | | | | x | | | | | | |
| "5" | x | | | x | | | x | | | x | | |
| "6" | x | x | | | | | | x | | | | |
| "7" | x | | x | | | x | | | | | | |
| "8" | x | x | x | | | | | | | x | | |
| "9" | x | | x | | | | | | | | | x |
| "R1" | | x | | | | | x | | x | | | |
| "R2" | | x | | | x | | | | x | | | |

Fig. 2

| Shift element | Gear stage |
|---|---|
| S1 | ZP7 |
| S2 | ZP3 and ZP5 |
| S3 | ZP3 and ZP7 |
| S4 | ZP5 |
| S5 | ZP5 |
| S6 | ZP6 |
| S7 | ZPR |
| S8 | ZP2 |
| S9 | ZP8 |
| S10 | ZP4 |

Fig. 3

DUAL CLUTCH TRANSMISSION DESIGNED AS REDUCTION GEARING

This application is a National Stage completion of PCT/EP2011/063332 filed Aug. 3, 2011, which claims priority from German patent application serial no. 10 2010 040 659.7 filed Sep. 13, 2010.

FIELD OF THE INVENTION

The invention relates to a dual clutch transmission designed as reduction gearing.

BACKGROUND OF THE INVENTION

A dual clutch transmission known from practice, is designed as reduction gearing in order to obtain different transmission ratios for forward travel and for backward travel, having a central transmission shaft, a hollow transmission shaft disposed concentrically hereto, a layshaft, and having two powershift elements. Both powershift elements have an operative connection with the drive unit at the input end. One of the two powershift elements is connected to the central transmission shaft at the output end, while the other of the two powershift elements is connected to the hollow transmission shaft at the output end. In order to demonstrate a transmission ratio via gear stages that can be engaged with and disengaged from the power flow via shift devices, the central transmission shaft and the hollow transmission shaft can be connected to the layshaft. In addition, multiple shift devices are each associated with two gear stages.

A dual clutch transmission having a dual clutch, the input end of which can be driven by a drive shaft of an engine, and the output end of which shares a drive connection with one of two gearbox input shafts respectively, disposed coaxially to one another, is known from document DE 10 2005 005 163 A1. The dual clutch transmission is formed having one intermediate shaft or exactly one layshaft, and features fixed or idler gears attached to or rotatably mounted on shafts, and the shift sets associated with the idler gears. The idler gears can be connected in a rotatably fixed manner via the shift sets in order to realize transmission ratios or transmission steps with each respective shaft. The shift sets are each associated with two gears that do not directly follow one another.

In the case of the two above-described dual clutch transmissions however, only seven transmission ratios are obtainable for forward travel, which is why engines that can be coupled with the dual clutch transmissions, in particular internal combustion engines, cannot be operated in their optimum operating range to the desired extent for a large part of the engines' operating range, especially in terms of available tractive force and low fuel consumption.

DE 10 2007 049 271 A1 describes a dual clutch transmission having at least two layshafts in order to be able to obtain multiple transmission ratios for forward and backward travel.

Due to the design of the dual clutch transmission with two layshafts, this transmission features a greater radial space requirement as compared with dual clutch transmissions having a single layshaft, which is not available to the degree needed in various vehicle systems.

SUMMARY OF THE INVENTION

The primary objective of the present invention is to provide a dual clutch transmission designed as reduction gearing, which exhibits a lower space requirement both in the radial direction, and in the axial direction and by means of which, more than seven transmission ratios for forward travel are obtained.

The dual clutch transmission according to the invention is designed as reduction gearing comprising a central transmission shaft, having a hollow transmission shaft disposed concentrically hereto, having exactly one layshaft, and having two powershift elements. Both powershift elements can be brought into an operative connection on the drive side with a drive unit as a start-up element of the dual clutch transmission. One of the two powershift elements is connected at the output end with the central transmission shaft, while the other of the two powershift elements is connected at the output end with the hollow transmission shaft. Accordingly, a rotational speed of the drive unit can be transmitted either to the central transmission shaft or to the hollow transmission shaft by selectively closing the two powershift elements. In order to depict a transmission ratio via gear stages that can be engaged with and disengaged from the power flow via shift devices, the central transmission shaft and the hollow transmission shaft can be connected to the layshaft. Furthermore, multiple shift devices are each associated with two gear stages.

According to the invention, a hollow shaft is provided on the layshaft disposed coaxially thereto, which can be coupled in a rotatably fixed manner via one of the shift devices to the layshaft and with which at least two gears of the gear stages are connected in a rotatably fixed manner. Provided on the central transmission shaft or the hollow transmission shaft is another hollow shaft disposed coaxially thereto, which can be connected to the central transmission shaft or the hollow transmission shaft via one of the shift devices, and to which at least two further gears of the gear stages are connected in a rotatably fixed manner. At least three transmission ratios are obtainable as a result of the shift element engaging into the power flow, in this case, three of the gear stages, by means of which one transmission ratio in each case is obtainable as a result of engagement into the power flow by only one shift element.

The design of the dual clutch system according to the invention, having exactly one layshaft as well as the hollow shaft disposed on the central transmission shaft or the hollow transmission shaft and the additional hollow shaft provided on the layshaft, in conjunction with the embodiment of at least three transmission ratios as so-called winding path gears, offers the possibility of obtaining a number of transmission ratios, preferably at least nine transmission steps for forward travel, with a low radial and axial space requirement and moreover with a low total weight of the dual clutch transmission, and the possibility of being able to operate an engine, preferably an internal combustion engine, in its optimum operating range to the extent desired.

Furthermore, the transmission ratios are obtainable due to the multiple use of the shift devices with a lower number of actuators for actuating the shift devices, whereby the dual clutch transmission can also be produced at low cost.

If one of the three transmission ratios obtainable, as a result of the shift element engaging into the power flow in each case three of the gear stages, is a first transmission ratio for forward travel, and an additional transmission ratio of the three transmission ratios is a ninth transmission ratio for forward travel, then the mechanical extension of the dual clutch transmission is reduced, which keeps speed losses in the area of the dual clutch transmission to a minimum.

Furthermore, because of its design, the dual clutch transmission according to the invention is characterized by its good powershift capability and can be combined with an electric motor in a structurally simple manner.

In an advantageous embodiment of the dual clutch system according to the invention two of the gear stages that must be engaged with the power flow in order to obtain the three transmission steps are each identical and the third respective gear pairing is varied. Due to the multiple use of the gear stages, a variety of transmission ratios is obtainable with the same low space requirement of the dual clutch transmission.

In a further alternative embodiment of the dual clutch system according to the invention designed as reduction gearing, which is designed having a central transmission shaft, a hollow transmission shaft disposed concentrically hereto, exactly one layshaft, and having two powershift elements, both powershift elements can be brought in operative connection with a drive unit as a start-up element on the drive side of the dual clutch transmission. One of the two powershift elements is connected to the central transmission shaft at the output end, while the other of the two powershift elements is connected to the hollow transmission shaft at the output end. Thus a rotational speed of the drive unit can be transmitted either to the central transmission shaft or to the hollow transmission shaft by selectively engaging the powershift elements. In order to depict a transmission ratio via gear stages that can be engaged with and disengaged from the power flow via shift devices, the central transmission shaft and the hollow transmission shaft can be connected to the layshaft. In so doing, two gear stages are each associated with multiple shift devices.

According to the invention, at least nine transmission ratios for forward travel are obtainable in a space-saving manner by engaging and disengaging the gear stages.

If at least three transmission ratios are obtainable as a result of the shift element engaging into the power flow in each case three of the gear stages, by means of which one transmission ratio in each case is obtainable as a result of engagement into the power flow by one shift element only, in an advantageous embodiment of the dual clutch system according to the invention, gear stages are engaged multiple times in order to obtain different transmission ratios, which makes it possible to design the dual clutch transmission with a very low space requirement.

Further space-saving embodiments of the dual clutch system according to the invention are designed with five shift devices, through each of which two gear stages can be engaged in the power flow, and/or comprise eight gear-set levels, each of which features spur gear stages having discrete transmission ratios.

Those features found in the following exemplary embodiments of the dual clutch transmission according to the invention are each suitable for further developing the subject matter of the invention. The combination of a given set of features does not represent a restriction on the development of the subject matter of the invention and is only essentially representative in nature.

Further advantages and advantageous embodiments of the dual clutch system according to the invention arise from the following exemplary embodiments described in principle with reference to the drawings, wherein, in the interest of clarity, the descriptions of the various embodiments use the same reference symbols for components having the same structure and function.

BRIEF DESCRIPTION OF THE DRAWINGS

The drawings show:

FIG. 2 a shift matrix for the dual clutch transmission according to FIG. 1;

FIG. 3 a tabular overview of the assignment between shift elements of shift devices and gear stages of the dual clutch transmission according to FIG. 1;

DETAILED DESCRIPTION OF THE PREFERRED EMBODIMENTS

Figure 1:
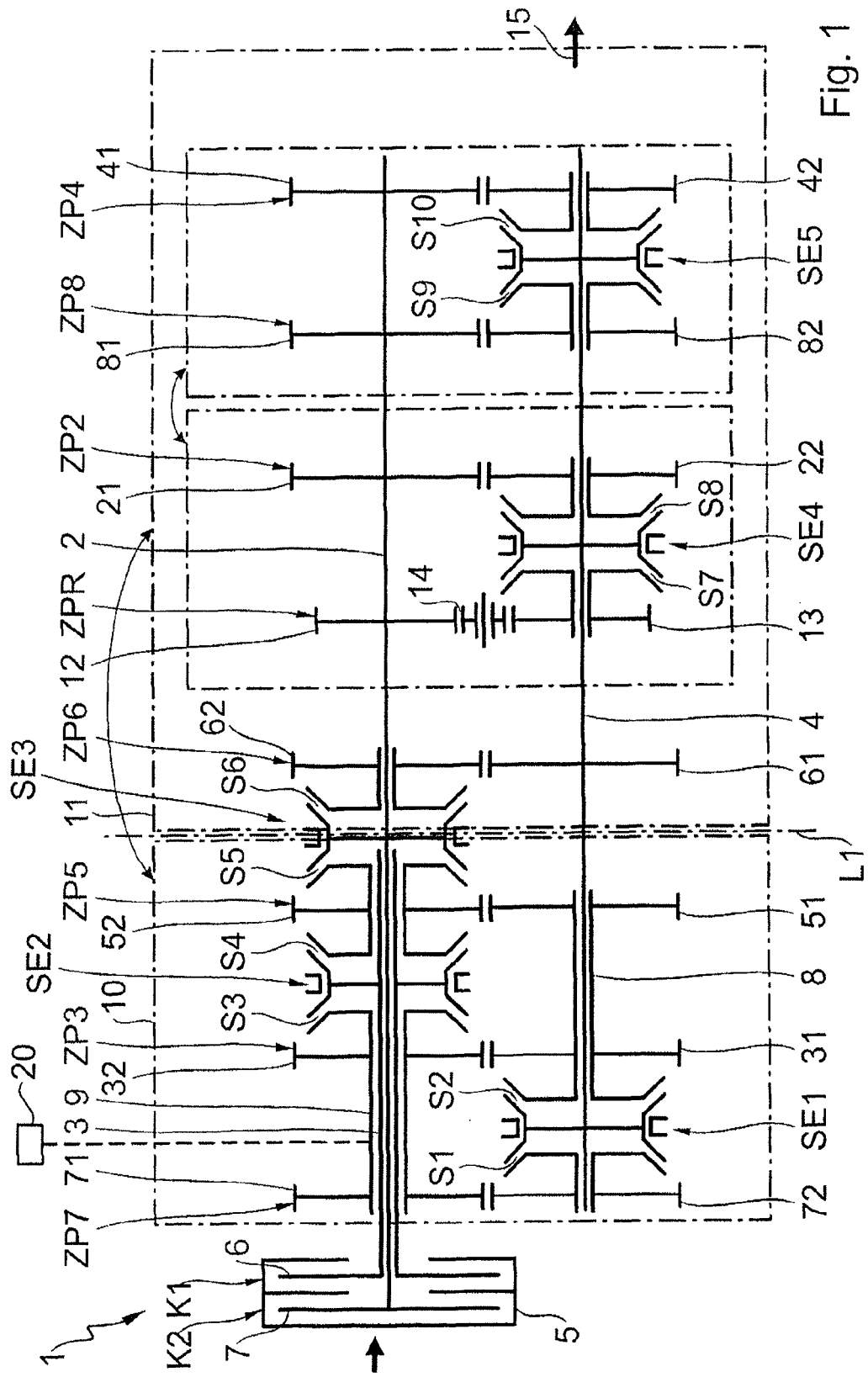
FIG. 1 a gear diagram of a first exemplary embodiment of the dual clutch system according to the invention.

FIG. 1 shows a dual clutch transmission 1 designed as reduction gearing having 17 gears, comprising a central transmission shaft 2, a hollow transmission shaft 3 disposed concentrically hereto, exactly one layshaft 4, and having two powershift elements K1, K2, which are presently designed as frictionally engaged lamellar clutches. Input elements of the powershift elements K1, K2, denoted as 5, are connected, or operatively connected, to a drive unit, which is not further represented in the drawing, for example an internal combustion engine in a vehicle drive train. An output element of the powershift element K1, denoted as 6, is connected to the hollow transmission shaft 3, while an output element of the powershift element K2, denoted as 7, is coupled in a rotatably fixed manner with the central transmission shaft 2. The structural formation of the two powershift elements K1, K2 shown in the drawing should be considered an example and is at the discretion of the person skilled in the art. Thus here, the two driven input elements 5 of the powershift elements K1, K2 are exemplified here as a shared outer disk carrier for both powershift elements K1, K2 and the two output elements 6, 7 of the powershift elements K1, K2 each as a corresponding inner disk carrier.

In order to obtain nine transmission ratios "1" to "9" for forward travel and two transmission ratios "R1", "R2" for backward travel, described in greater detail in FIG. 2, the central transmission shaft 2 and the hollow transmission shaft 3 can be connected to the layshaft 4 via exactly eight gear stages ZP2, ZP3, ZP4, ZP5, ZP6, ZP7, ZP8 and ZPR, which are engaged with and disengaged from the power flow of the dual clutch transmission via exactly five shift devices SE1 to SE5. The eight gear stages ZP2 to ZPR comprise exactly eight gear planes disposed in parallel in an axial direction. Two gear stages ZP7, ZP3 or ZP3, ZP5 or ZP5, ZP6 or ZPR, ZP2 or ZP8, ZP4 respectively, are each associated with the five shift devices SE1 to SE5.

The shift devices SE1 to SE5 are presently designed as so-called double synchronizations and each comprise two shift elements S1, S2 or S3, S4 or S5, S6 or S7, S8 or S9, S10 respectively, via each of which at least one of the gear stages ZP2 to ZPR can be coupled with the central transmission shaft 2, the hollow transmission shaft 3 or the layshaft 4, and in whose range differential speeds of rotation can be compensated for or reduced to some extent.

Provided on the layshaft 4 and disposed coaxially thereto is a hollow shaft 8, which can be coupled to the layshaft 4 in a rotatably fixed manner via the shift element S2 of the shift device SE1 and with which presently a gear 31 of the gear stage ZP3 and a gear 51 of the gear stage ZP5 are each connected in a rotatably fixed manner. Furthermore, an additional hollow shaft 9 is presently provided on the hollow transmission shaft 3 disposed coaxially thereto, which can be connected to the hollow transmission shaft 3 in a rotatably fixed manner via the shift element S3 of the shift device SE2, and with which an additional gear 32 of the gear stage ZP3 and a gear 71 of the gear stage ZP7 are connected in a rotatably fixed manner.

Alternatively to the above described embodiment of the dual clutch transmission 1 having the five shift devices SE1 to SE5, which each comprise two shift elements S1 and S2, S3 and S4, S5 and S6, S7 and S8, S9 and S10, it is also possible to design one or more of the shift devices SE1 to SE5 as separate shift devices, wherein more than five actuators are to be provided in order to operate the individual shift elements S1 to S10.

An available torque from a drive unit on the input elements 5 may optionally be transferred to the central transmission shaft 2 or the hollow transmission shaft 3 via the two powershift elements K1 and K2. In order to be able to obtain the various transmission ratios "1" to "R2", the gear stages ZP2 to ZPR must be engaged with the power flow of the dual clutch transmission 1 or disengaged therefrom via the shift devices SE1 to SE5 or their shift elements S1 to S10 in the following manner, described in detail below.

In order to be able to carry out a gear change in the range of each of the two powershift elements K1 and K2 without any loss of drive power, the gear ratio currently being selected for each is preselected in the range of an existing subtransmission 10 or 11 that is currently in a load-free operating state by respectively disengaging and engaging the appropriate shift elements S1 to S10, and the currently engaged powershift element K1 or K2 is subsequently transferred into a disengaged operating state, while the currently disengaged powershift element K2 or K1 is transferred to its engaged operating state during an overlapping gear change.

The transmission ratios "2" to "8" for forward travel and the transmission ratio "R2" for backward travel are each obtainable in the dual clutch transmission 1 by individually engaging the gear pairings ZP2, ZP3, ZP4, ZP5, ZP6, ZP7, ZP8 or ZPR.

The first transmission ratio "1" for forward travel is obtainable through the simultaneous engagement of the three gear stages ZP3, ZP5 and ZP2 into the power flow of the dual clutch transmission 1 at the shift element end and thereby obtains a so-called winding path gear. Moreover, the ninth transmission ratio "9" for forward travel is selected by simultaneously engaging the three gear stages ZP5, ZP3 and ZP7 in the dual clutch transmission 1 at the shift element end, while the transmission ratio "R1" for backward travel is available by simultaneously engaging the three gear stages ZP3, ZP5 and ZPR in the dual clutch transmission 1 at the shift element end. The ninth transmission ratio "9" for forward travel and the transmission ratio "R1" for backward travel are also obtained in this manner.

The two gear stages ZP3 and ZP5 must always be engaged with the power flow in order to obtain the three transmission ratios "1", "9" and "R1", while the gear stage ZP2, the gear stage ZP7 or the gear stage ZPR must each be additionally engaged in order to obtain the transmission ratios "1", "9" or "R1".

The four gear stages ZPR, ZP2, ZP8 and ZP4 can be brought into an operative connection with the layshaft 4 via the shift devices SE4 and SE5, wherein a gear 12 of the gear stage ZPR, a gear 21 of the gear stage ZP2, a gear 81 of the gear stage ZP8 and a gear 41 of the gear stage ZP4 are each designed as fixed gears connected to central transmission shaft 2 in a rotatably fixed manner. Furthermore, one gear 13 of the gear stage ZPR, one gear 22 of the gear stage ZP2, one gear 82 of the gear stage ZP8 and one gear 42 of the gear stage ZP4 are each formed as an idler gear and disposed on the layshaft 4 in a rotatable manner. The two gears 12 and 13 are each meshed with an intermediate gear 14, whereby the change in the direction of rotation needed in the dual clutch transmission 1 in order to obtain reverse travel operation is obtainable in the range of the gear stage ZPR. The idler gears 13, 22, 82 and 42 of the gear stages ZPR, ZP2, ZP8 and ZP4 can each be connected to the layshaft 4 in a rotatably fixed manner via the shift elements S7, S8, S9 or S10 of the shift devices SE4 or SE5.

An additional gear 72 of the gear stage ZP7, which is designed as an idler gear, is disposed on the layshaft 4 in a rotatable manner and can be connected to the layshaft 4 in a rotatably fixed manner via the shift element S1 of the shift device SE1, while one gear 61 of the gear stage ZP6 is designed as a fixed gear and connected to the layshaft 4 in a rotatably fixed manner. An additional gear 62 of the gear stage ZP6 is designed as an idler gear, is presently disposed on the central transmission shaft 2 in a rotatable manner, and can be connected thereto in a rotatably fixed manner via the shift element S6.

A second gear 52 of the gear stage ZP5 is designed as an idler gear, which is disposed on the hollow transmission shaft 3 in a rotatable manner, and can be connected to the hollow transmission shaft 3 in a rotatably fixed manner via the shift element S4 of shift device SE2, or to the central transmission shaft 2 in a rotatably fixed manner via the shift element S5 of the shift device SE3. Furthermore the additional gear 52 of the gear stage ZP5, which meshes with the gear 51 that is connected to the hollow shaft 8 in a rotatably fixed manner, SE1 can also be connected to the layshaft 4 via the shift element S2 of the shift device.

The gear stages ZP7 and ZP3 are associated with the first subtransmission 10 and the gear stages ZP6, ZPR, ZP2, ZP8 and ZP4 are associated with the second subtransmission. Due to the above described possible coupling of the gear stage ZP5, both with the hollow transmission shaft 3 and with the central transmission shaft 2, the gear stage ZP5 can be associated to both subtransmissions 10 and 11, wherein this double association is not an obstacle to a gear change between an uneven transmission ratio "1", "3", "5", "7", "9" toward an even transmission ratio "2", "4", "6", "8" with no loss of drive power, with the exception of three direct shifts from transmission ratio "4", "6" and "8" directly to transmission ratio "1", in which case shifting is only possible with a loss of drive power.

The shift elements S1 to S10 are actuated in accordance with the shift logic described in detail in FIG. 2 in order to obtain the transmission ratios "1" to "9" for forward travel and in order to obtain the transmission ratios "R1" and "R2" for backward travel, wherein the shift elements S1 to S10, which are marked with an X in the corresponding cell, must each be engaged or kept in an engaged state in order to obtain one of the transmission ratios "1" to "R2", while the additional shift elements S1 to S10, the cells of which are empty, must be switched to their disengaged operating state or left in this state. At the same time, the powershift element K1 or K2 that is marked with an X must be switched to an engaged operating state, while the other powershift element K2 or K1 that is not marked with an X must be disengaged.

The gear set shown in FIG. 1 can be modified while retaining the same function by variously positioning the gear stages ZP2 to ZPR, as well as the shift devices SE1 to SE5 or their shift elements S1 to S10 in relation to one another as described in detail below, wherein the shift elements S1 to S10, which are preferentially designed as synchronizers are permanently associated with the gear stages ZP2 to ZPR according to the table shown in FIG. 3. Due to this permanent association, the shift matrix shown in FIG. 2 is not changed by a positioning of the gear stages ZP2 to ZPR, which are presently designed as spur gear stages, that differs from the disposition of the gear stages ZP2 to ZPR shown in FIG. 1.

The shift element S1 is associated with the gear stage ZP7, the shift element S2 is associated with the gear stages ZP3 and ZP5, the shift element S4 is associated with the gear stage ZP5, the shift element S5 is associated with the gear stage ZP5, the shift element S6 is associated with the gear stage ZP6, the shift element S7 is associated with the gear stage ZPR, the shift element S8 is associated with the gear stage ZP2, the shift element S9 is associated with the gear stage ZP8 and the shift element S10 is associated with the gear stage ZP4.

In the representation according to FIG. 1, the gear stages ZP7, ZP3 and ZP5 of the first subtransmission 10 are disposed between the powershift elements K1 and K2 and the gear stages ZP6, ZPR, ZP2, ZP8 and ZP4 associated with the second subtransmission. In an embodiment of the dual clutch transmission 1 that deviates therefrom, the gear stages ZP6, ZPR, ZP2, ZP8 and ZP4 are disposed between the powershift elements K1 and K2 and the gear stages ZP5, ZP3, and ZP7 of the first subtransmission 10, wherein the variant disposition that differs from FIG. 1 represents an exchange of the two subtransmission 10 and 11, which is accomplished by mirroring the dual clutch transmission 1 along the line L1.

Figure 4:
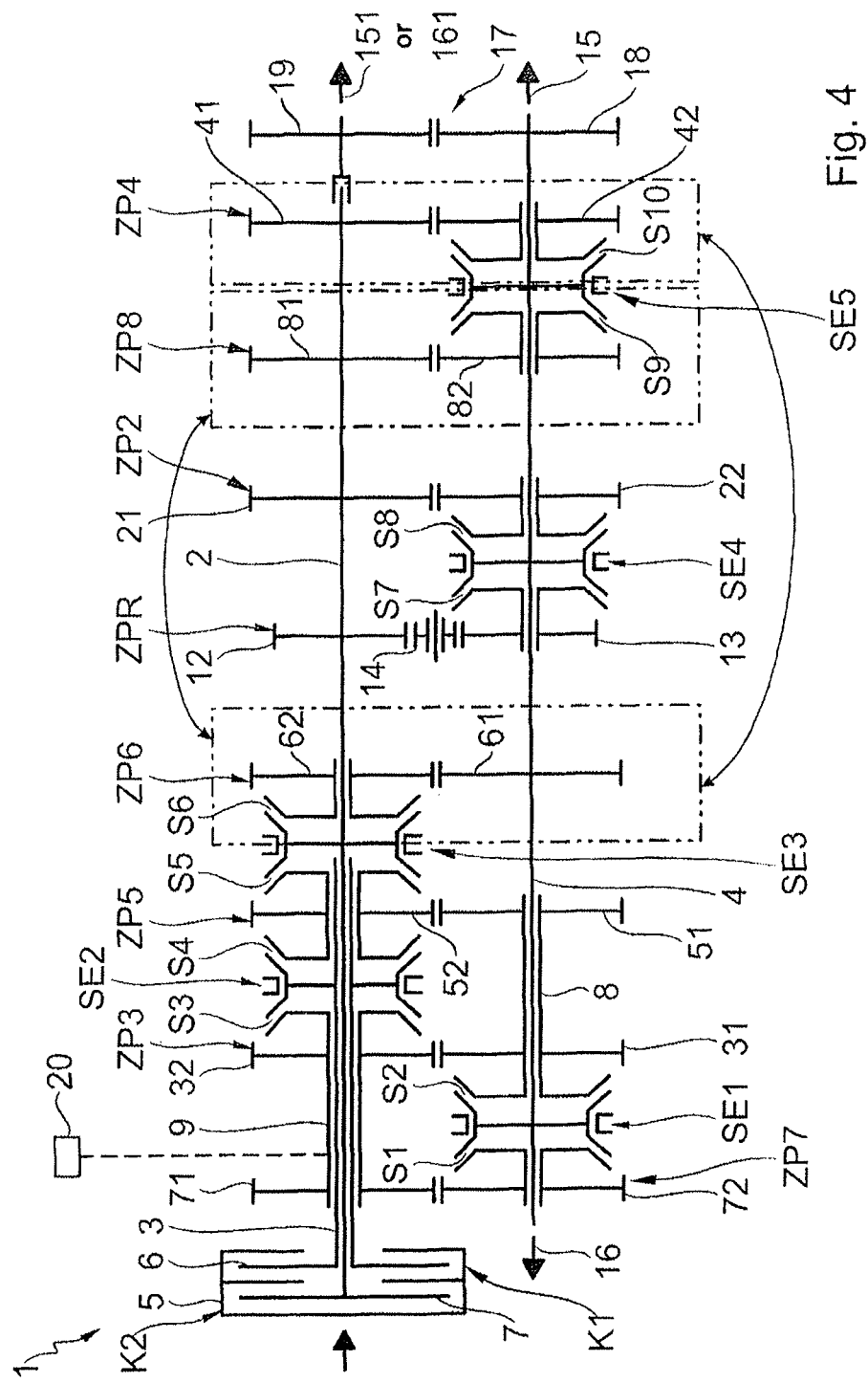
FIG. 4 a gear diagram of a second exemplary embodiment of the dual clutch system according to the invention.
Figure 5:
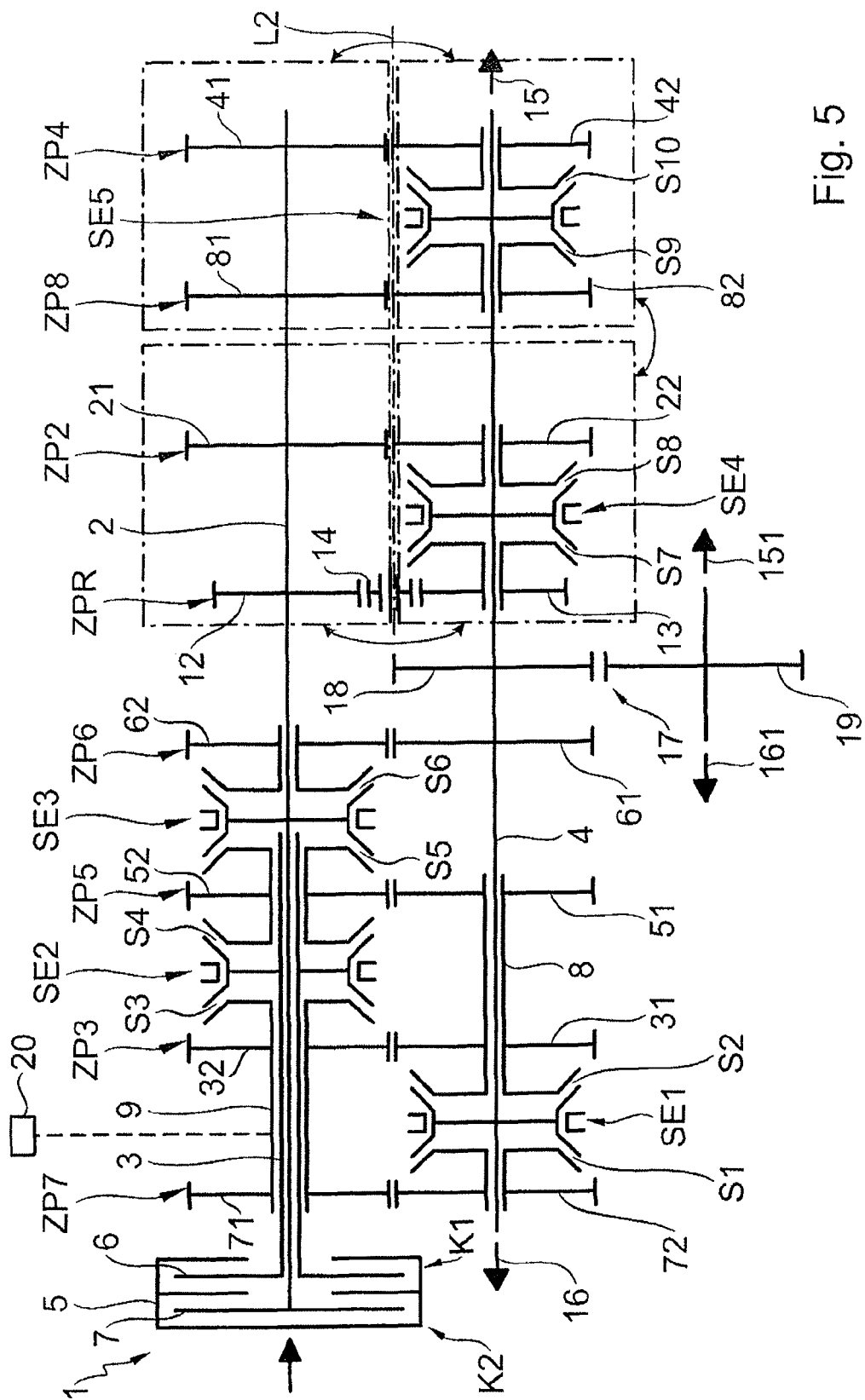
FIG. 5 a gear diagram of a third exemplary embodiment of the dual clutch system according to the invention.
Figure 6:
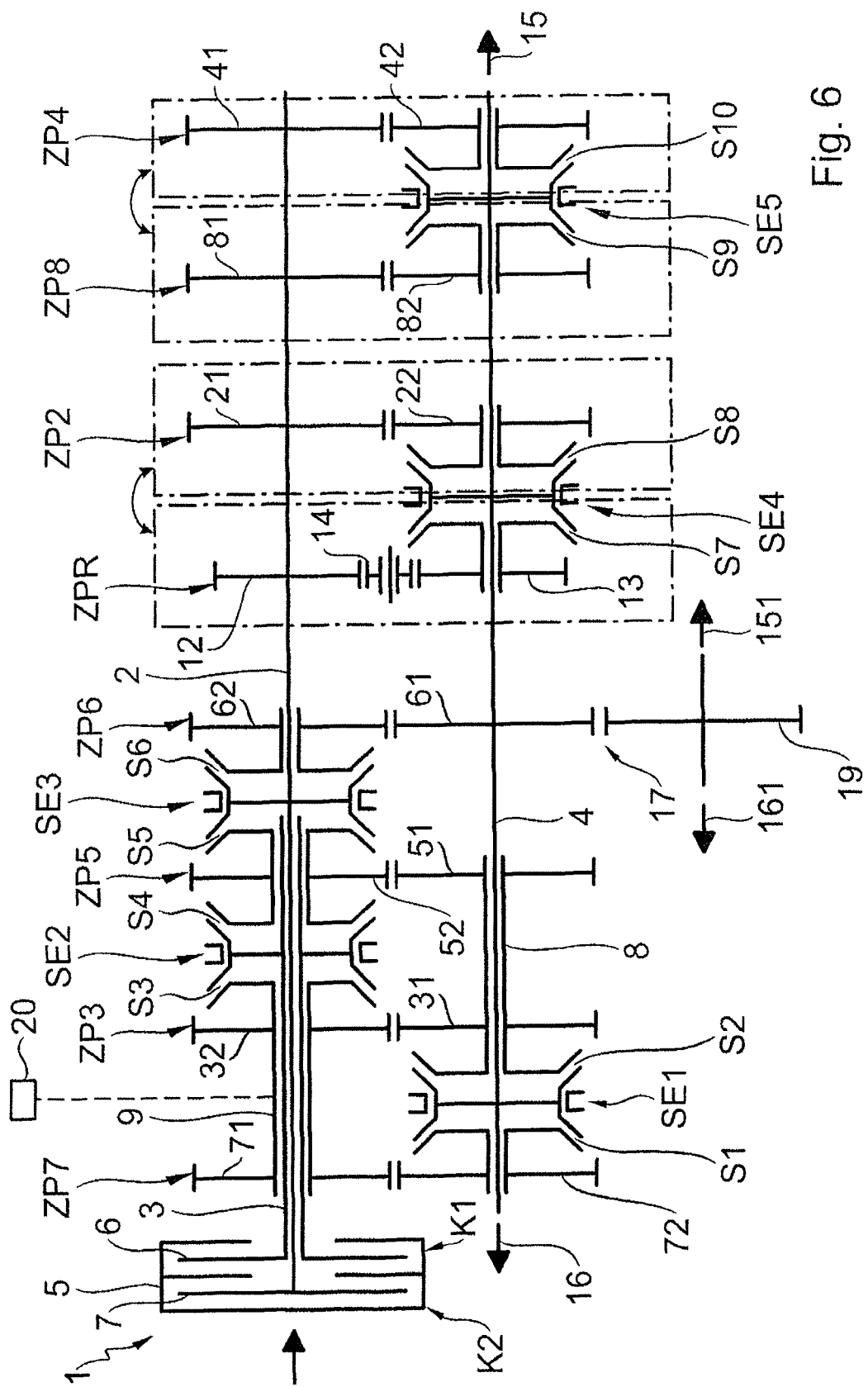
FIG. 6 a gear diagram of a fourth exemplary embodiment of the dual clutch system according to the invention.

Alternatively to the last described variant disposition of the gear stages ZP2 to ZPR cumulative thereto, the gear stages ZP6, ZPR, ZP2, ZP8 and ZP4 can be mutually exchanged in an axial extension of the central transmission shaft 2 of the dual clutch transmission 1 in the manner described in detail in FIG. 4 to FIG. 6 without changing the functionality of the dual clutch transmission 1 as described in detail in FIG. 1. In addition, in a deviation from the variant disposition shown in FIG. 1, the gear stages ZPR and ZP2 as well as the gear stages ZP8 and ZP4 can be arranged along an additional line L2 in mirrored form, wherein the gear stages ZPR, ZP2, ZP8 and ZP4 are engaged by coupling the gear stages ZPR, ZP2, ZP8 and ZP4 with the layshaft 4, to the central transmission shaft 2 or to the hollow transmission shaft 3.

The gear stages ZP8 and ZP4 can be engaged with the power flow via the shared shift device SE5, wherein the gear stage ZP8, in an axial extension of the central transmission shaft 2 in relation to the associated shift device SE5, is disposed on one of the sides of the shift device SE5 that faces the powershift elements K1 and K2 and the gear stage ZP4 on a side of the shift device SE5 facing away from the powershift elements K1 and K2.

Alternatively, the gear stage ZP4 can be disposed on the side of the shift device SE5 facing the powershift elements K1 and K2 and the gear stage ZP8 can be disposed on the side of the shift device SE5 facing away from the powershift elements K1 and K2.

Furthermore, the two gear stages ZPR and ZP2 of the second subtransmission 11 can be engaged with the power flow of the dual clutch transmission 1 via the shared shift device SE4. Here it is also possible to dispose one of the two gear stages ZPR or ZP2 in an axial extension of the central transmission shaft 2 in relation to the associated shift device SE4 on a side of the shift device SE4 that faces the powershift elements K1 and K2, and the other respective gear stage ZP2 or ZPR on a side of the shift device SE4 that faces away from the powershift elements K1 and K2.

Again, alternatively to the positioning of the gear stages ZP2 to ZPR of the dual clutch transmission 1 described above or cumulative thereto, it is also possible to dispose the two gear stages ZP8 and ZP4 of the second subtransmission 11 in an axial extension of the central transmission shaft 2 between the powershift elements K1 and K2 and the two gear stages ZPR and ZP2 of the second subtransmission 11, or to dispose the gear stages ZPR and ZP2 on an axial extension of the central transmission shaft between the powershift elements K1 and K2 and at least two of the gear stages ZP8 and ZP4.

Again alternatively or cumulatively to the variant dispositions of the gear stages ZP2 to ZPR of the dual clutch transmission 1 described above, it is also possible to exchange one of the gear stages ZP8 or ZP4 with the gear stage ZP6.

The different variant dispositions of the gear stages ZP2 to ZPR in relation to one another produce 256 variants of the dual clutch transmission 1 having the same functionality.

Depending on which variant disposition of the gear stages ZP2 to ZPR of the dual clutch transmission 1 is presently being used, the additional hollow shaft 9 is disposed either directly on the central transmission shaft 2 or, as shown in the drawing, on the hollow transmission shaft 3. Furthermore, the gear stage ZP6 can be coupled with the central transmission shaft 2 or the hollow transmission shaft 6 via the shift element S6 depending on the respective variant disposition.

Depending on the respective variant disposition of the gear stages ZP2 to ZPR of the dual clutch transmission 1 chosen, the gear stage ZP3 and the gear stage ZP7 can be coupled with the central transmission shaft 2 or the hollow transmission shaft 3 as well as with the layshaft 4 via the shift elements S1, S2 and S3 of the shift devices SE1 and SE2.

Again, depending on the disposition of the gear stage ZP6 and the gear stages ZP4 and ZP8, the gear stage ZP6 and one of the gear stages ZP4 or ZP8 can be engaged with the power flow via a shared shift device, while the gear stage ZP8 or ZP4 and the gear stage ZP5, which can be coupled with the central transmission shaft 2, the hollow transmission shaft 3 and with the layshaft 4, can each be engaged with the power flow via a shared shift device.

Depending on the respective variant disposition of the gear stages ZP2 to ZPR of the dual clutch transmission 1, the idler gears 13, 22, 82 and 42 of the gear stages ZPR, ZP2, ZP8 and ZP4 are disposed on the central transmission shaft 2, the hollow transmission shaft 3 and/or on the layshaft 4, and can each be coupled with one of the shafts via the shift device SE4 or rather the shift device SE5.

In the embodiment of the dual clutch transmission 1 shown in FIG. 1, an output drive 15 of the dual clutch transmission 1 is disposed coaxially to the layshaft 4 and the dual clutch transmission 1 is formed with only one transmission output. The output drive 15 of the dual clutch transmission can be coupled with at least one drivable vehicle axis via appropriate devices.

If the dual clutch transmission 1 is part of a four-wheel vehicle drive train in accordance with FIG. 1, a transfer case device must be situated downstream from the dual clutch transmission 1, through which the torque in the range of the gear stage ZP4, which is transferred from the dual clutch transmission 1 via the output drive 15, can be distributed to multiple drivable vehicle axes.

Alternatively, it is also possible to transfer the torque applied to the layshaft 4 from the dual clutch transmission 1 both in the range of the gear stage ZP4 via the output drive 15 and also in the range of the gear stage ZP7 via an additional output drive 16 in the manner described in FIG. 4 to FIG. 6, wherein both the output drive 15 and the additional output drive 16 are disposed coaxially to the layshaft 4.

Alternatively to the coaxial disposition of the output drives 15 and 16 relative to the layshaft 4, it is also possible to guide the output drive 15 and/or the additional output drive 16 to the layshaft 4 and/or to the central transmission shaft 2 from the dual clutch transmission 1 with an offset in the manner additionally shown in FIG. 4 to FIG. 6, wherein the axially offset variant of the output drive or of the additional output drive are each more clearly indicated by the reference numbers 151 or 161. Here, the offset is realized in a structurally simple manner via an additional output drive constant gear pair 17, wherein a gear 18 of the output drive constant gear pair 17, which is designed as a fixed gear, is connected to the layshaft 4 in a rotatably fixed in the manner shown in FIG. 4 and FIG. 5. The gear 18 meshes with a gear 19 of the output drive constant gear pair 17, which is connected with the output drive 15 and/or the output drive 16.

In an embodiment of the dual clutch transmission 1 shown in FIG. 4, the output drive constant gear pair 17 is provided in an axial extension of the central transmission shaft 2 on a side of the gear stage ZP4 that faces away from the gear stage ZP8, wherein the gear 18 is disposed coaxially to the central transmission shaft 2 and rotatably mounted.

In an embodiment of the dual clutch transmission 1 shown in FIG. 5, the gear 19 of the output drive constant gear pair 17 is axially disposed between the gear stage ZP6 and the gear stage ZPR in spatial terms.

In an embodiment of the dual clutch transmission 1 shown in FIG. 6, the output drive 151 and the additional output drive 161 are likewise disposed having an axial offset to the layshaft 4 and to the central transmission shaft 2, wherein the fixed gear of the output drive constant gear pair 17 is presently the fixed gear 61 of the gear stage ZP6, with which the gear 19 is engaged.

Alternatively, it is also possible to axially dispose an output drive constant gear pair needed in order to achieve an axial offset to the layshaft and/or to the central transmission shaft between the gear stage ZP2 and the gear stage ZP8 in spatial terms.

In the case of the embodiments in the drawings, the dual clutch transmission 1 is also formed with at least one electric motor 20. The electric motor 20 can be mechanically engaged with the power flow of the dual clutch transmission 1. In order to do so, the electric motor 20 must be connected to one of the shafts of the gear set of the dual clutch transmission 1. It thereby becomes possible to provide an operative connection between the electric motor 20 and the dual clutch transmission 1 in the range of a fixed gear or an idler gear of the gear set of the dual clutch transmission 1, or to link the electric motor 20 to the gear set in the range of an additional fixed gear.

An advantageous operative connection between the electric motor 20 and the power flow of the dual clutch transmission 1 exists when the operative connection can be shifted both between the electric motor 20 and the powershift elements K1 and K2, and between the electric motor 20 and the output drive 15 or 16 respectively, or 151 or 161 respectively, depending on the respective operating condition of the vehicle drive train and the electric motor, since this would allow hybrid functions to be obtained such as a charging process for the electrical accumulator associated with the electric motor 20 when the vehicle is at a standstill, or a purely driving mode, which is realized during the motorized operation of the electric motor 20.

A connection of the electric motor 20 to the dual clutch transmission 1 in the area of gear stages ZP7, ZP3 or ZP5 is particularly suitable, taking into account the foregoing.

The dual clutch transmission according to the invention 1 is presently designed having five packetized coupling devices or the five shift devices SE1 to SE5, which can only be operated via five actuators. Furthermore, the dual clutch transmission 1 has a low space requirement, being designed having only eight gear planes, in order to be able to obtain at least nine transmission ratios "1" to "9" for forward travel and two transmission ratios "R1", "R2" for backward travel. The sixth transmission ratio "6" can be designed as a direct gear. By designing the first transmission ratio "1" and the ninth transmission ratio "9" for forward travel as winding path gears, the dual clutch transmission 1 features a reduced mechanical extension and therefore low speed losses. Furthermore, the dual clutch transmission 1 is also characterized by a good powershift capability and by good hybrid capability.

An adverse effect on the overall efficiency of the dual clutch transmission 1 that occurs while obtaining the winding path gears "1" and "R1" due to simultaneously engaging three gear stages ZP3, ZP5, ZP2 or ZP5, ZP3, ZP7 or ZP3, ZP5, ZPR into the power flow is negligible, since these transmission ratios exhibit substantially lower driving-mode shares over the life cycle and over the entire consumption as compared to the additional transmission ratios of the dual clutch transmission 1. This is applicable even if the output drive 15 or 151 respectively and/or the additional output drive 16 or 161 respectively are connected to the layshaft 4 via the additional output drive constant gear pair 17.

Reference Characters

1 dual clutch transmission
2 central transmission shaft
3 hollow transmission shaft
4 layshaft
5 input element of the powershift elements
6 output element of a powershift element
7 output element of a powershift element
8 hollow shaft
9 hollow shaft
10 first subtransmission
11 second subtransmission
12 gear
13 gear
14 intermediate gear
15, 151 output drive
16, 161 additional output drive
17 output drive constant gear pair
18 gear
19 gear
20 electric motor
21, 22 gear
31, 32 gear
42, 42 gear
51, 52 gear
61 62 gear
71, 72 gear
81, 82 gear
L1, L2 line
K1, K2 powershift element
SE1 to SE5 shift device
S1 to S10 shift element
ZP2 to ZPR gear stage
"1" to "9" transmission ratio for forward travel
"R1", "R2" transmission ratio for backward travel

The invention claimed is:

1. A dual clutch transmission (1) designed as a reduction gearing, the dual clutch transmission (1) comprising:
a central transmission shaft (2) having a hollow transmission shaft (3) disposed concentrically thereto, exactly one layshaft (4) and first and second powershift elements (K1, K2);

both of the first and the second powershift elements (K1, K2) being operatively connectable, on a drive side, with a drive assembly in operative connection;

an output end of one of the first and the second powershift elements (K1) being connected with the central transmission shaft (2);

an output end of the other of the first and the second powershift elements (K2) being connected with the hollow transmission shaft (3);

the central transmission shaft (2) and the hollow transmission shaft (3) being connectable to the layshaft (4) to obtain transmission ratios ("1" to "R2") via a plurality of gear stages (ZP2 to ZPR), which are engagable with and disengagable from a power flow via a plurality of shift devices (SE1 to SE5);

the hollow transmission shaft (3) only directly driving input of a second one of the plurality of shift devices (SE1, SE2, SE3, SE4 SE5);

two of the plurality of gear stages ((ZP7, ZP3), (ZP3, ZP5), (ZP5, ZP6), (ZPR, ZP2), ZP8, ZP4)) being associated with each of the plurality of shift devices (SE1 to SE5);

a hollow shaft (8) being coaxially disposed on the layshaft (4) and being couplable to the layshaft (4) via a first one of the plurality of shift devices (SE1) in a rotatably fixed manner, and at least two other gears (31, 51) of the plurality of gear stages (ZP3, ZP5) being connected to the hollow shaft in a rotatably fixed manner;

an additional hollow shaft (9) being provided on either the central transmission shaft (2) or the hollow transmission shaft (3) and being coaxial therewith, and the additional hollow shaft (9) being connectable to the central transmission shaft (2) or the hollow transmission shaft (3) via the second one of the plurality of shift devices (SE2), at least two further gears (32, 71) of the plurality of gear stages (ZP3, ZP7) being connected, in a rotatably fixed manner, with the additional hollow shaft (9); and at least three of the transmission ratios ("1", "9", "R1") being obtainable by simultaneously engaging three of the plurality of gear stages ((ZP3, ZP5, ZP2), (ZP5, ZP3, ZP7), (ZP3, ZP5, ZPR)) on a shift element side into the power flow, while remaining transmission ratios ("2", "3", "5", "7", "R2") being obtainable by engaging only one of shift element (S1 to S10) of the plurality of shift devices (SE1, SE2, SE3, SE4 SE5) into the power flow.

2. The dual clutch transmission according to claim 1, wherein two of the three three-gear-stages ((ZP3, ZP5, ZP2) or (ZP3, ZP5, ZP7) or (ZP3, ZP5, ZPR)) that are engaged with the power flow in order to obtain the three transmission ratios ("1", "9", "R1") are identical while a respective third gear pairing (ZP2 or ZP7 or ZPR) varies.

3. The dual clutch transmission according to claim 1, wherein four of the plurality of gear stages (ZPR, ZP2, ZP8, ZP4) are operatively connectable with the layshaft (4) by at least one other of the plurality of shift devices (SE4, SE5).

4. The dual clutch transmission according to claim 1, wherein one of the gear stages (ZP6), via which a sixth transmission ratio ("6") for forward travel is obtainable, is couplable with either the central transmission shaft (2) or the hollow transmission shaft (3) via a third one of the plurality of shift devices (SE3).

5. The dual clutch transmission according to claim 1, wherein one of the plurality of gear stages (ZP5), via which a fifth transmission step ("5") for forward travel is obtainable, is couplable with the central transmission shaft (2) via a third one of the plurality of shift devices (SE3), is couplable with the hollow transmission shaft (3) via the second shift device (SE2), and is couplable with the layshaft (4) via the first shift device (SE1) of the plurality of shift devices (SE1 to SE5).

6. The dual clutch transmission according to claim 1, wherein one of the plurality of gear stages (ZP3), via which a third transmission step ("3") for forward travel is obtainable, and an additional gear stage (ZP7), via which a seventh transmission step ("7") for forward travel is obtainable, is couplable with either the central transmission shaft (2) or the hollow transmission shaft (3) and with the layshaft (4) via one of the plurality of shift devices (SE1, SE2).

7. The dual clutch transmission according to claim 1, wherein a first portion of the gear stages (ZP3, ZP5, ZP7) are associated with a first subtransmission (10) and a second portion of the gear stages (ZP2, ZP4, ZP5, ZP6, ZP8, ZPR) are associated with a second subtransmission (11); and the gear stages (ZP3, ZP7) associated with the first subtransmission (10) are disposed between the gear stages (ZP2, ZP4, ZP6, ZP8, ZPR) of the second, subtransmission (11) and the powershift elements (K1, K2), or the gear stages (ZP2, ZP4, ZP6, ZP8, ZPR) of the second subtransmission (11) are disposed between the gear stages (ZP3, ZP7) of the first subtransmission (10) and the powershift elements (K1, K2).

8. The dual clutch transmission according to claim 5, wherein the gear stage (ZP5), which is couplable with the central transmission shaft (2), the hollow transmission shaft (3) and the layshaft (4) are assigned either to the first subtransmission (10) or the second subtransmission (11) through engagement in the power flow on the shift element side.

9. The dual clutch transmission according to claim 7, wherein at least two of the gear stages (ZP8, ZP4) of the second subtransmission (11) are engaged with the power flow via a shared shift device (SE5); and one of the two gear stages (ZP4 or ZP8) is disposed in an axial extension of the central transmission shaft (2) in relation to the shared shift device (SE5) on a side of the shift device (SE5) which faces the first and the second powershift elements (K1, K2), and the other one of the two gear stages (ZP8 or ZP4) is disposed on a side of the shared shift device (SE5) that faces away from the first and the second powershift elements (K1, K2).

10. The dual clutch transmission according to claim 7, wherein at least two of the additional gear stages (ZPR, ZP2) of the second subtransmission (11) are engagable with the power flow via a shared shift device (SE4), one of the two additional gear stages (ZPR or ZP2) is disposed in an axial extension of the central transmission shaft (2) in relation to the shared shift device (SE4) on a side of the shared shift device (SE4) that faces the first and the second powershift elements (K1, K2), and the other of the additional gear stages (ZP2 or ZPR) is disposed on a side of the shared shift device (SE4) that faces away from the first and the second powershift elements (K1, K2).

11. The dual clutch transmission according to claim 10, wherein at least two of the plurality of gear stages (ZP8, ZP4) of the second subtransmission (11) are disposed in an axial extension of the central transmission shaft (2) between the first and the second powershift elements (K1, K2), and either at least two of the additional gear stages (ZPR, ZP2) of the second subtransmission (11) or at least two of the additional gear stages (ZPR, ZP2) of the second subtransmission (11) are disposed in an axial extension of the central transmission shaft (2) between the first and the second powershift elements (K1, K2), and the at least two of the gear stages (ZP8, ZP4) of the second subtransmission (11).

12. The dual clutch transmission according to claim 5, wherein an additional gear stage (ZP6) of the second subtransmission (11) and the gear stage (ZP5), which is couplable with the central transmission shaft (2), the hollow transmission shaft (3) and the layshaft (4), are engagable in the power flow via a shared shift device (SE3).

13. The dual clutch transmission according to claim 12, wherein the additional gear stage (ZP6) of the second subtransmission (11) and a gear stage (ZP4 or ZP8) of at least two gear stages (ZP4, ZP8) of the second subtransmission (11) are each engagable in the power flow via a first shared shift device (SE5); and
an additional gear stage (ZP8 or ZP4) of the at least two gear stages (ZP4, ZP8) of the second subtransmission (11) and the shared gear stage (ZP5), which is couplable with the central transmission shaft (2), the hollow transmission shaft (3) and the layshaft (4), are each engagable with the power flow via another shared shift device (SE3).

14. The dual clutch transmission according to claim 9, wherein idler gears (42, 82) of at least two gear stages (ZP4, ZP8) of the second subtransmission (11) are disposed on at least one of the central transmission shaft (2), the hollow transmission shaft (3) and the layshaft (4), and the idler gears (42, 82) of the at least two gear stages (ZP4, ZP8) of the second subtransmission (11) are couplable via at least one of the plurality of shift devices (SE3 or SE5).

15. The dual clutch transmission according to claim 10, wherein idler gears (13, 22) of at least two of the additional gear stages (ZPR, ZP2) of the second subtransmission (11) are disposed on at least one of the central transmission shaft (2), the hollow transmission shaft (3) and the layshaft (4), and the idler gears (13, 22) of at least two of the additional gear stages (ZPR, ZP2) of the second subtransmission (11) are couplable via the shared shift device (SE4).

16. The dual clutch transmission according to claim 1, wherein at least a portion of an output drive (15, 16) of the dual clutch transmission (1) is provided coaxially to the layshaft (4).

17. The dual clutch transmission according to claim 1, wherein at least a portion of an output drive (15) of the dual clutch transmission (1) is provided coaxially to the central transmission shaft (2).

18. The dual clutch transmission according to claim 1, wherein at least a portion of an output drive (15, 16) of the dual clutch transmission (1) is provided and is axially offset to the layshaft (4) and to the central transmission shaft (2); and
the axial offset, between the output drive (151, 161) of the dual clutch transmission (1) and the layshaft (4), is achieved via an additional gear stage (17), and the additional gear stage (17) comprises a fixed gear (18; 61) disposed on the layshaft, and is either a fixed gear (61) of a gear stage (ZP6) provided in order to obtain a transmission ratio ("6") or an additional fixed gear (18).

19. The dual clutch transmission according to claim 1, wherein exactly five shift devices ((S1, S2), (S3, S4), (S5, S6), (S7, S8), (S9, S10)) are provided via which each of the two gear stages ((ZP7, ZP3), (ZP3, ZP5), (ZP5, ZP6), (ZPR, ZP2), (ZP8, ZP4)) are engagable with the power flow.

20. The dual clutch transmission according to claim 1, wherein exactly eight gear gear stages (ZP2, ZP3, ZP4, ZP5, ZP6, ZP7, ZP8, ZPR) are provided, each of which comprises spur gear stages having discrete transmission ratios ("2", "3", "4", "5", "6", "7", "8", "R2").

21. The dual clutch transmission according to claim 1, wherein at least nine transmission ratios ("1" to "9") for forward travel are obtainable by the dual clutch transmission (1).

22. The dual clutch transmission according to claim 1, wherein at least one transmission ratio ("R1", "R2") for rearward travel is obtainable by the dual clutch transmission (1).

23. The dual clutch transmission according to claim 1, wherein an electric motor (20) is provided that is engagable with the power flow of the dual clutch transmission (1).

24. A dual clutch transmission (1) designed as a reduction gearing, the dual clutch transmission (1) comprising:
a central transmission shaft (2) having a hollow transmission shaft (3) disposed concentrically thereto, exactly one layshaft (4) and first and second powershift elements (K1, K2),
both of the first and the second powershift elements (K1, K2) being either connected or operationally connected to a drive unit on the drive side;
an output end of one of the first and the second powershift elements (K1) being connected to the central transmission shaft (2);
an output end of the other of the first and the second powershift elements (K2) being connected with the hollow transmission shaft (3),
the central transmission shaft (2) and the hollow transmission shaft (3) being connectable via a plurality of gear stages (ZP2 to ZPR), the plurality of gear stages (ZP2 to ZPR) being engaged with and disengaged from the power flow via a plurality of shift devices (SE1 to SE5) in order to obtain a desired transmission ratio ("1" to "R2");
two gear stages ((ZP7, ZP3), (ZP3,ZP5), (ZP5, ZP6), (ZPR, ZP2), (ZP8, ZP4)) being each associated with each of the plurality of shift devices (SE1 to SE5);
the hollow transmission shaft (3) only directly driving an input of a second one of the plurality of shift devices (SE1, SE2, SE3, SE4 SE5) while the central transmission shaft (2) only directly driving an input of another one of the shift devices (SE1, SE2, SE3,SE4 SE5) and four fixed gears (12, 21, 41, 81); and
engagement and disengagement of the gear stages (ZP2 to ZPR), implement at least nine transmission ratios ("1" to "9") for forward travel.

25. The dual clutch transmission according to claim 24, wherein at least three transmission ratios ("1", "9", "R1") are obtainable by engaging three gear stages, ((ZP3, ZP5, ZP2), (ZP5, ZP3, ZP7), (ZP3, ZP5, ZPR)) respectively, into the power flow on a switch element side, while remaining transmission ratios ("2", "3", "5", "7", "R2") are obtainable by engagement, into the power flow, of only one shift element.

26. The dual clutch transmission according to claim 24, wherein a further hollow shaft (8) is provided on the layshaft (4) disposed coaxially thereto, the further hollow shaft (8) is couplable with the layshaft (4) in a rotatably fixed manner via one of the plurality of shift devices (SE1), and at least two gears (31, 51) of the gear stages (ZP3, ZP5) are connected to the further hollow shaft (8) in a rotatably fixed manner.

27. The dual clutch transmission according to claim 24, wherein an additional hollow shaft (9) is provided on either the central transmission shaft (2) or the hollow transmission shaft (3) disposed coaxially thereto, and the additional hollow shaft (9) is connectable to either the central transmission shaft (2) or the hollow transmission shaft (3) via one of the plurality of shift devices (SE2), and to which at least two further gears (32, 71) of the plurality of gear stages (ZP3, ZP7) are connected to the additional hollow shaft (9) in a rotatably fixed manner.

28. The dual clutch transmission according to claim 24, wherein by engaging and disengaging at least one desired gear stage (ZP2, ZP3, ZP4, ZP5, ZP6, ZP7, ZP8, ZPR), at least one transmission ratio ("R1", "R2") for rearward travel is obtainable by the dual clutch transmission (1).

29. The dual clutch transmission according to claim 24, wherein exactly eight gear sets (ZP2, ZP3, ZP4, ZP5, ZP6, ZP7, ZP8, ZPR) are provided, and each of the eight gear sets (ZP2, ZP3, ZP4, ZP5, ZP6, ZP7, ZP8, ZPR) comprises spur gear stages with discrete transmission ratios ("2", "3", "4", "5", "6", "7", "8", "R2").

30. The dual clutch transmission according to claim 24, wherein exactly five shift devices (SE1 to SE5) are provided via which two gear stages ((ZP7, ZP3), (ZP3, ZP5), (ZP5, ZP6), (ZPR, ZP2), (ZP8, ZP4)) are engagable with the power flow.

31. The dual clutch transmission according to claim 24, wherein an electric motor (20) is provided that is engagable with the power flow of the dual clutch transmission (1).

\* \* \* \* \*